US00RE48900E

(19) United States
(12) Reissued Patent
Ahn et al.

(10) Patent Number: US RE48,900 E
(45) **Date of Reissued Patent: *Jan. 25, 2022**

(54) FABRIC TREATING APPARATUS

(71) Applicant: LG ELECTRONICS INC., Seoul (KR)

(72) Inventors: Jaehyun Ahn, Seoul (KR); Youngjin Doh, Seoul (KR); Sunyong Kim, Seoul (KR)

(73) Assignee: LG Electronics Inc., Seoul (KR)

( * ) Notice: This patent is subject to a terminal disclaimer.

(21) Appl. No.: 16/797,836

(22) Filed: Feb. 21, 2020

Related U.S. Patent Documents

Reissue of:
(64) Patent No.: 10,138,586
Issued: Nov. 27, 2018
Appl. No.: 14/972,454
Filed: Dec. 17, 2015

U.S. Applications:
(63) Continuation of application No. 16/797,187, filed on Feb. 21, 2020, which is an application for the reissue of Pat. No. 10,138,586.

(30) Foreign Application Priority Data

Dec. 19, 2014 (KR) ..... 10-2014-0184787

(51) Int. Cl.
*D06F 39/00* (2020.01)
*D06F 39/14* (2006.01)
(Continued)

(52) U.S. Cl.
CPC ..... *D06F 58/203* (2013.01); *D06F 25/00* (2013.01); *D06F 39/008* (2013.01); *D06F 58/10* (2013.01); *D06F 58/20* (2013.01); *D06F 58/206* (2013.01)

(58) Field of Classification Search
CPC ..... D06F 58/203; D06F 58/20; D06F 58/206; D06F 58/10; D06F 39/008; D06F 25/00
See application file for complete search history.

(56) References Cited

U.S. PATENT DOCUMENTS 5,305,484 A 4/1994 Fitzpatrick et al.
5,685,623 A * 11/1997 Katz ..... D06F 39/12 312/263

(Continued)

FOREIGN PATENT DOCUMENTS

CN 102733160 10/2012
DE 202012103881 1/2013

(Continued)

OTHER PUBLICATIONS

United States Office Action dated Jul. 13, 2021 issued in co-pending related U.S. Appl. No. 16/797,892.

(Continued)

*Primary Examiner* — Elizabeth L McKane
(74) *Attorney, Agent, or Firm* — Ked & Associates, LLP

(57) ABSTRACT

A fabric treating apparatus includes a casing that includes a treating chamber and a machinery room that is located below the treating chamber. The fabric treating apparatus further includes a base that is located at a bottom of the machinery room. The fabric treating apparatus further includes a heat pump module that is configured to condition air supplied to the treating chamber. The fabric treating apparatus further includes at least one supporter that is configured to support the heat pump module and that defines a space between the base and the heat pump module. The fabric treating apparatus further includes a steam generating module that is located in the space and that is configured to generate steam and supply steam to the treating chamber. The fabric treating apparatus further includes a controller (Continued)

that is configured to control at least one of the heat pump module or the steam generating module.

20 Claims, 7 Drawing Sheets

(51) Int. Cl.

| | |
|---|---|
| ***D06F 58/20*** | (2006.01) |
| *D06F 25/00* | (2006.01) |
| *D06F 58/10* | (2006.01) |

(56) References Cited

U.S. PATENT DOCUMENTS

| | | | | |
|---|---|---|---|---|
| 8,468,718 | B2 | 6/2013 | Favret et al. | |
| 2008/0155757 | A1 | 7/2008 | Kim et al. | |
| 2010/0132130 | A1* | 6/2010 | Moon | D06F 58/10 8/137 |
| 2010/0218566 | A1 | 9/2010 | Moon et al. | |
| 2011/0030147 | A1* | 2/2011 | Yoo | D06F 58/10 8/137 |
| 2012/0247157 | A1* | 10/2012 | Park | D06F 58/203 68/4 |

FOREIGN PATENT DOCUMENTS

| | | |
|---|---|---|
| EP | 0 821 096 | 1/1998 |
| EP | 2 514 863 | 10/2012 |
| EP | 2 514 865 | 10/2012 |
| JP | S39843 | 1/1964 |
| JP | H1-165808 | 11/1989 |
| JP | H5-154299 | 6/1993 |
| JP | H8-126798 | 5/1996 |
| JP | S52-109659 | 8/1997 |
| JP | H 11-300088 | 11/1999 |
| JP | 2005-253589 | 9/2005 |
| JP | 2008-264165 | 11/2008 |
| JP | 2011-136074 | 7/2011 |
| JP | 2012-52571 | 3/2012 |
| JP | 2013-252240 | 12/2013 |
| JP | 2014-140463 | 8/2014 |
| KR | 10-0782375 | 12/2007 |
| KR | 10-0782377 | 12/2007 |
| KR | 10-2009-0013981 | 2/2009 |
| KR | 10-2009-0016917 | 2/2009 |
| KR | 10-2009-0069755 | 7/2009 |
| KR | 10-2009-0102402 | 9/2009 |
| KR | 10-2011-0019095 | 2/2011 |
| KR | 10-2011-0067834 | 6/2011 |
| KR | 10-2011-0067887 | 6/2011 |
| KR | 10-1120902 | 4/2012 |
| KR | 10-2012-0074557 | 7/2012 |
| KR | 10-2014-0108454 | 9/2014 |
| KR | 10-1435823 | 9/2014 |
| KR | 10-2014-0124240 | 10/2014 |

OTHER PUBLICATIONS

Extended European Search Report issued in European Application No. 15201313.2 dated Apr. 25, 2016, 8 pages.

International Search Report and Written Opinion in International Application No. PCT/KR2015/013987, dated Apr. 18, 2016, 8 pages.

Japanese Office Action in Japanese Application No. 2017-532995, dated Jul. 17, 2018, 5 pages.

* cited by examiner

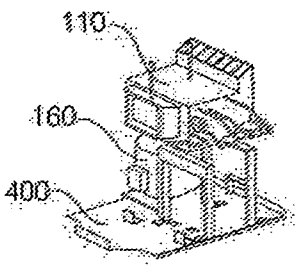
FIG. 4(a)
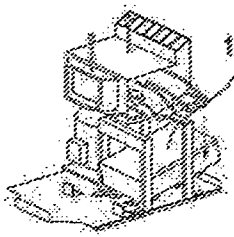
FIG. 4(b)
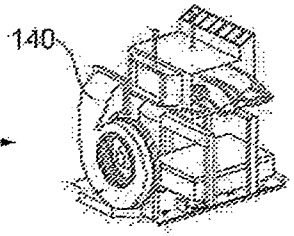
FIG. 4(c)
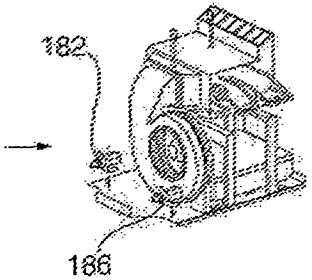
FIG. 4(d)
FIG. 4(e)
FIG. 4(f)
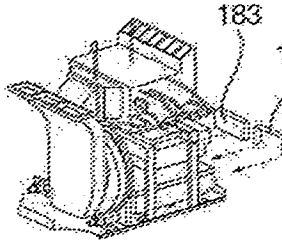
FIG. 4(g)
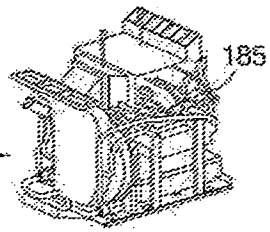
FIG. 4(h)

FABRIC TREATING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a Continuation Reissue of Reissue application Ser. No. 16/797,187 filed Feb. 21, 2020, which is a Reissue of U.S. Pat. No. 10,138,586, filed on Dec. 17, 2015 and issued on Nov. 27, 2108, which* claims priority under 35 U.S.C. § 119 to Korean Patent Application No. 10-2014-0184787, filed on Dec. 19, 2014 in the Korean Intellectual Property Office, whose entire disclosure is incorporated herein by reference. *More than one reissue application has been filed for the reissue of U.S. Pat. No. 10,138,586. The reissue application numbers are U.S. patent application Ser. No. 16/797,187, filed on Feb. 21, 2020; U.S. patent application Ser. No. 16/797,725, filed on Feb. 21, 2020; U.S. patent application Ser. No. 16/797,762, filed on Feb. 21, 2020; U.S. patent application Ser. No. 16/797,864, filed on Feb. 21, 2020; and U.S. patent application Ser. No. 16/797,892, filed on Feb. 21, 2020.*

FIELD

The present disclosure relates to a fabric treating apparatus.

BACKGROUND

A fabric treating apparatus refers to any device which is used at home or at a laundromat to manage clothes by washing, drying, and flatting out the same.

For example, the fabric treating apparatus includes a washing machine, a drying machine, a washer-and-dryer, a refresher, a steamer for removing creases on fabric, and the like.

The refresher is designed to keep clothes in a clean and fresh condition, and, for this purpose, it sprays aroma to the fabric, prevents static electricity of the fabric, removes creases on the fabric, and the like.

A general iron removes creases on fabric by providing steam thereto. The steamer removes creases without heating the clothes.

A fabric treating apparatus having the functions of the refresher and the steamer is able to remove creases and unpleasant odors of fabric by using steam and heated air.

SUMMARY

According to an innovative aspect of the subject matter described in this application, a fabric treating apparatus includes a casing that includes a treating chamber that is configured to receive clothes; and a machinery room that is located below the treating chamber; a base that is located at a bottom of the machinery room; a heat pump module that is configured to condition air supplied to the treating chamber; at least one supporter that is configured to support the heat pump module and that defines a space between the base and the heat pump module; a steam generating module that is located in the space and that is configured to generate steam and supply steam to the treating chamber; and a controller that is configured to control at least one of the heat pump module or the steam generating module, the controller being located in the space below the steam generating module.

The fabric treating apparatus may include one or more of the following optional features. The at least one supporter includes legs that are fixed to the base; and a shelf that is supported by the legs, where the heat pump module is supported by the shelf. The at least one supporter includes a supporter fixing tab that includes a surface that faces the base and that is located at a lower part of at least one of the legs, and the base includes a supporter fixing part that includes a supporter fastening hole that is configured to receive the supporter fixing tab. The supporter fixing tab is configured to slide into a pocket that is defined by the supporter fastening hole. A size of the pocket is about equal to a size of the supporter fixing tab. The fabric treating apparatus includes a first supporter that includes a first supporter fixing tab that is configured to slide into a first supporter fastening hole in a first direction; and a second supporter that includes a second supporter fixing tab that is configured to slide into a second supporter fastening hole in a second direction that is opposite the first direction.

The base includes a metal material, and the supporter fixing part includes a plastic material. The supporter fixing part is formed by cutting, about perpendicular to a direction in which the supporter fixing tab is configured to insert, a portion of the base having a predetermined length and then upwardly pressing a predetermined peripheral area of the cut portion. The supporter fastening hole is formed through plastic deformation of the cut portion. The fabric treating apparatus includes a fastening member that is configured to couple the base and the at least one supporter and that vertically penetrates the supporter fixing part and the supporter fixing tab.

The casing includes an opening that is located at a rear side of the casing and that is configured to receive the controller, the heat pump module is located above the controller, and the fabric treating apparatus further includes a blower that is configured to blow air into an interior of the heat pump module. The fabric treating apparatus includes a panel that is detachably coupled to the casing and that is configured to close the opening. The blower is located in front of the at least one supporter. The blower is coupled to the base. The base includes a blower installation tab that protrudes from the base and that is configured to couple to the blower. The fabric treating apparatus includes an air intake duct that is configured to guide air into the blower and that is located in front of the blower.

The air intake duct is fixed to at least one of the blower or the base. A [stream] *steam* generating module fixing tab is located at one of the steam generating module or the supporter, and an installation hole is configured to receive the steam generating module fixing tab and is located at another of the steam generating module or the supporter opposite the steam generating module fixing tab. The at least one supporter includes a pair of supporters that are spaced apart from each other and that are about perpendicular to a front and rear direction of the base, the installation hole is located on one of the pair of the supporters, and the steam generating module is coupled, by the fastening member, to another one of the pair of the supporters opposite the installation hole, and the steam generating module fixing tab is inserted into the installation hole. The controller includes at least one controller fixing tab that is configured to slide into a controller fixing hole that is located at the base.

The subject matter described in this application aims to provide a fabric treating apparatus in which devices in a machinery room is configured to facilitate maintaining and repairing the devices.

In addition, the subject matter described in this application aims to provide a fabric treating apparatus that includes a machinery room that is arranged so that a user can remove a particular device without removing other devices.

Further, the subject matter described in this application aims to provide a fabric treating apparatus of which a controller, a steam generating module, and a heat pump module are capable of being independently removed from a machinery room Moreover, the subject matter described in this application aims to provide a fabric treating device with improved space utilization of a machinery room.

BRIEF DESCRIPTION OF THE DRAWINGS

FIGS. 4(a)-(h) show a procedure of how to assemble an example device assembly.

DETAILED DESCRIPTION

Figure 1:
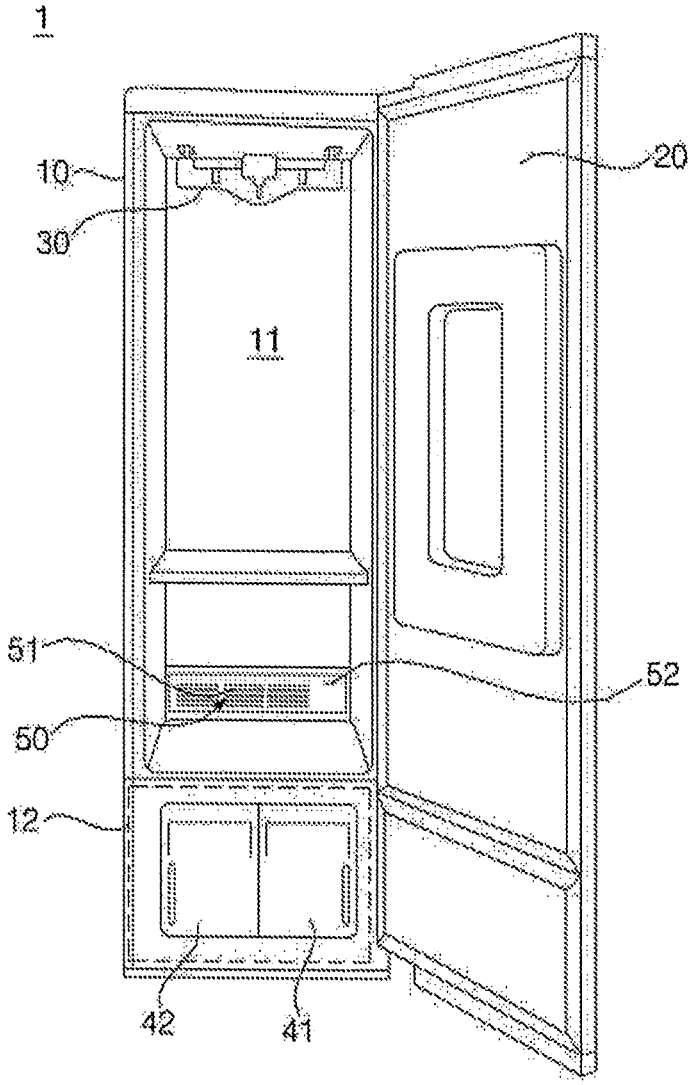
FIG. 1 is a perspective view illustrating a fabric treating apparatus.
Figure 2:
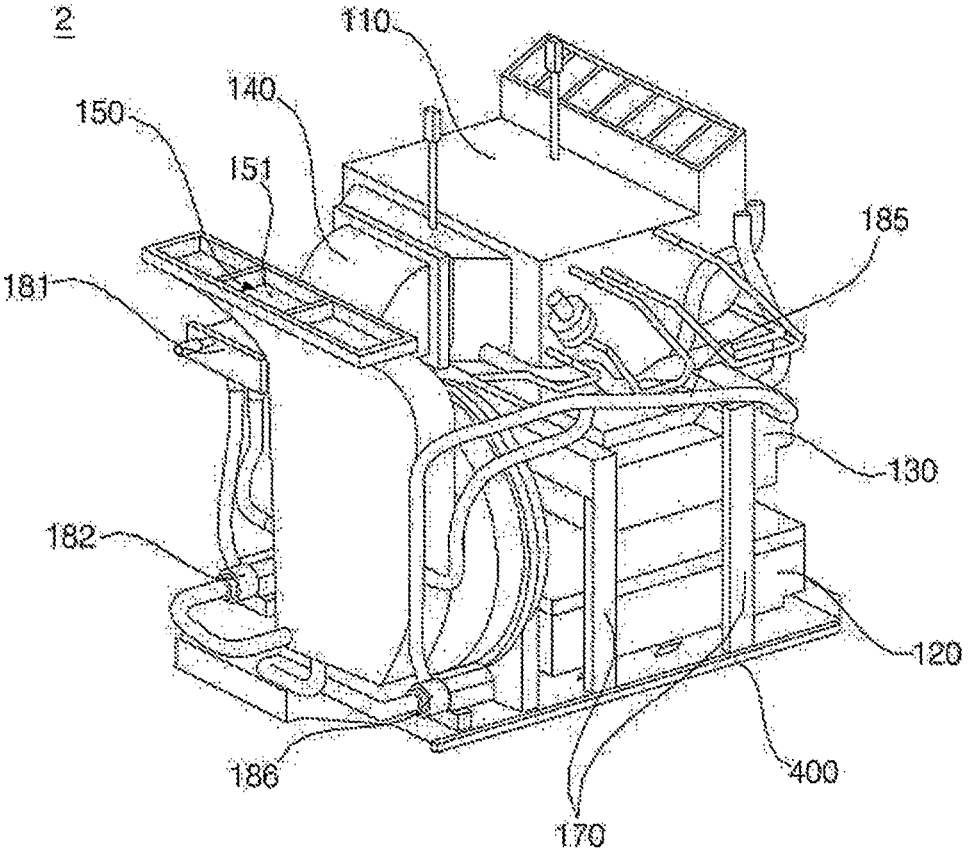
FIG. 2 is a diagram illustrating an example device assembly installed in an example machinery room.
Figure 3:
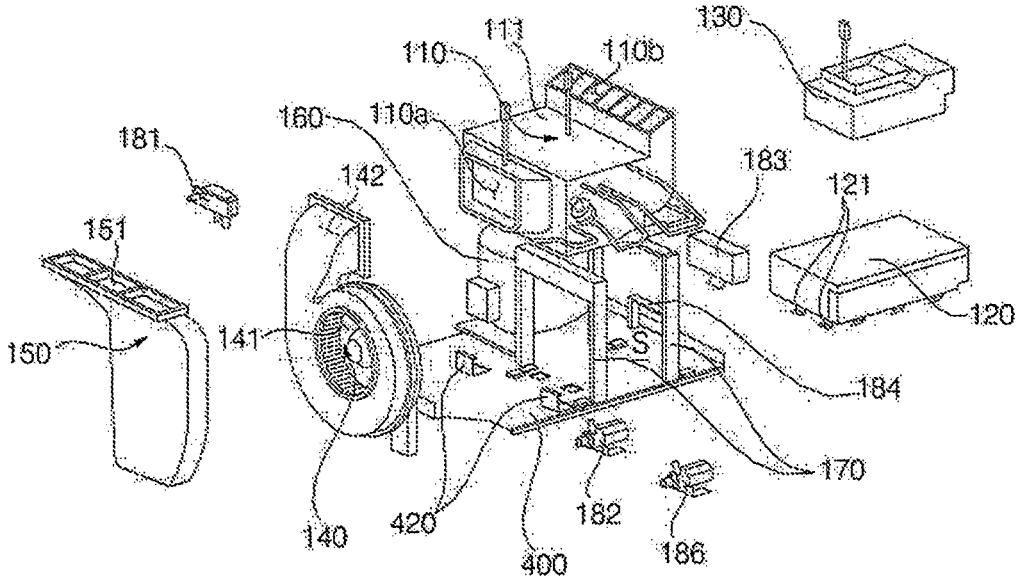
FIG. 3 is an exploded perspective view illustrating an example device assembly.
Figure 5A:
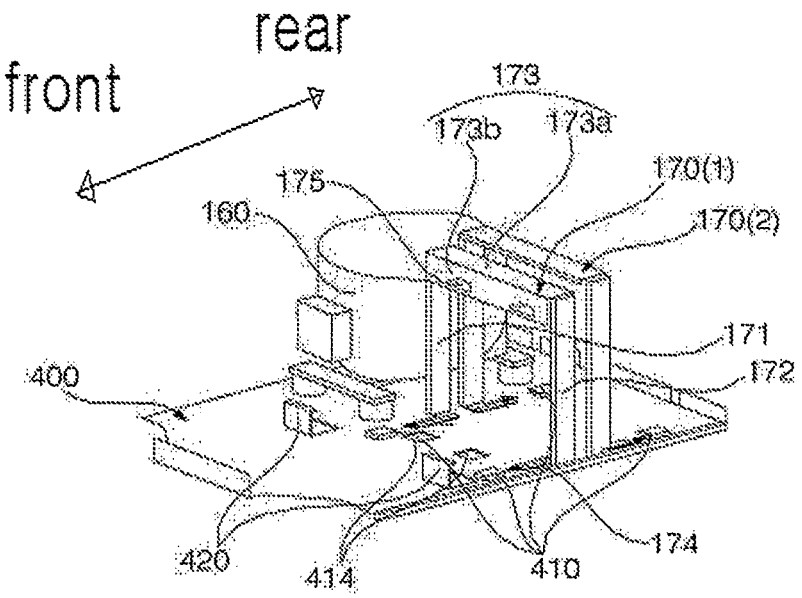
FIGS. 5(a) and (b) are diagrams illustrating an example structure in which a supporter is mounted on a base.
Figure 6A:
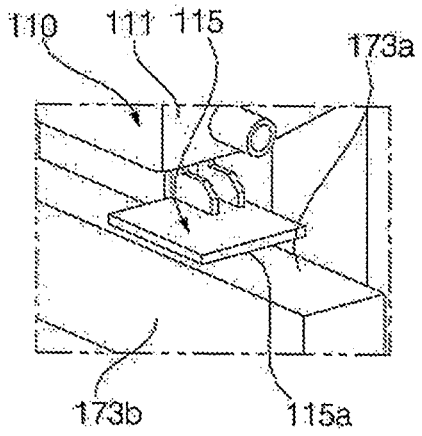
FIGS. 6(a) and (b) are diagrams illustrating an example installation structure of a heat pump module.

FIG. 1 illustrates an example fabric treating apparatus. FIG. 2 illustrates an example device assembly installed in an example machinery room. FIG. 3 illustrates an example device assembly. FIGS. 4(a)-(h) illustrate an example assembly of an example device assembly. FIGS. 5(a) and (b) illustrate an example structure in which a supporter is mounted on a base. FIGS. 6(a) and (b) illustrate an example installation structure of a heat pump module.

Referring to FIGS. 1 to 6, a fabric treating apparatus 1 includes a casing 10 forming an open front treating chamber 11, and a door *20* for closing the open front of the treating chamber 11.

A hanger rod 30 on which clothes hangers are to be hung is provided in an upper part of the treating chamber 11. The hanger rod 30 may be configured to move in a back and forth, up and down and/or right and left direction in the treating chamber 11 by a driving device, such as a motor. In some implementations, such movement is a reciprocating motion with a predetermined cycle.

A machinery room 12 may be provided outside the treating chamber 11 (e.g., below the treating chamber 11) within the casing 10, and various devices, such as a heat pump module 110, a controller 120, and a steam generating module 130, may be disposed in the machinery room 12. In some implementations, the casing 10 may include a base 400 which defines a bottom of the machinery room 12. The base 400 may be formed with a metal sheet.

An air outlet 51 discharging air blown by a blower 140 into the treating chamber 11, and a steam outlet 52 discharging steam generated by a [stream] *steam* generating module 130 may be formed in the lower part of the treating chamber 11. In some implementations, the air outlet 51 and the steam outlet 52 are formed as one body on a low panel 50 which defines a lower part of the treating chamber 11.

The steam generating module 130 is a device which generates steam. The steam generating module 130 may include a heater for applying heat to water. Steam generated according to an operation of the heater may be guided to the steam outlet 52 via a predetermined steam supply path.

A water supply tank 41 for storing water to be supplied to the steam generating module 130 may be disposed in the lower part of the treating chamber 11. The water supply tank 41 may be detachably coupled to the casing 10. A user may fill the water supply tank 41 with water after detaching the water supply tank 41 from the casing 10.

A sump may be disposed in the machinery room 12 to collect condensed water which is generated while steam generated by the steam generating module 130 moves along the steam supply path. The sump may be connected to the treating chamber 11 via a path. In some implementations, the condensed water on the bottom of the treating chamber 11 may be gathered in the sump.

A water drain pump 182 may be mounted on a base 400 to discharge the condensed water from the sump to a drain container 42. The drain container 42 may be detachably coupled to the casing 10. A user may detach the drain container 42 from the casing 10 and empty the drain container 42. The sump may be disposed in an inner low part of an air intake duct 150, and a nozzle module 181 may be further provided to discharge the condensed water stored in the sump to the drain container 42 via the water drain pump 182.

On the base 400, a water supply pump 186 may be mounted to supply water stored in the water supply tank 41 to the steam generating module 130. The water supply pump 186 may be connected to the steam generating module 130 via a water supply hose 185.

The heat pump module 110 is provided for air conditioning. The conditioned air is supplied to the treating chamber 11. The heat pump module 110 may be connected to the compressor 160 via a refrigerant line. The heat pump module 110 may include a condenser, an expansion valve, and an evaporator through which refrigerant passes in order when transferred via the refrigerant line.

Referring to FIG. 3, the heat pump module 110 may include a housing 111 forming an inner space where the condenser is housed. An air inlet 110a and an air outlet 110b may be formed in the housing 111. The air inlet 110a introduces air into the space where the condenser is housed, and the air outlet 110b discharges air being heat exchanged with the condenser. Not only the condenser, but also the evaporator may be housed in the housing 111.

The blower 140 is an air blowing device, and may include a fan which is rotated by a motor. A vent 142 discharging air blown by the fan is connected to the air inlet 110a of the housing 111. Accordingly, the air blown by the blower 140 is supplied to the housing 111 through the air inlet 110a, and the supplied air is heated by heat exchanging with the condenser. And the heated air is discharged through the air outlet 110b of the housing 111. In some implementations, the blower 140 is a centrifugal blower configured to guide the air, which is introduced through an opening 141 opened in an axial direction of the fan (e.g., centrifugal fan), toward the vent 142 via a scroll-type path embracing the surroundings of the fan.

The air intake duct 150 guiding air toward the opening 141 of the blower 140 may be disposed in front of the blower 140. The air intake duct 150 may be fixed by the blower 140. In some implementations, the duct 150 may be fixed by the base 400.

A blower installation tab 420 may be formed in the base 400. The blower installation tab 420 may formed by cutting a portion of the base 400 and bending the cut portion in a vertical direction. The blower 140 may be coupled to the blower installation tab 420 by a fastening member, such as a bolt and a screw.

The air intake duct 150 may include an air inflow path through which air passes. For efficient use of the inner space of the machinery room 12, the air intake duct 150 may be extended upward from the opening 141 of the blower 140. The air inflow path may have a width in a front-and-rear direction, which is smaller than a width in a left-and-right direction. The air intake duct 150 may have an opening 151 formed on a top surface thereof, and an outlet connected the vent 142 of the blower 140. Air inside the treating chamber 11 may be introduced through the opening 151.

The supporter 170 supports the heat pump module 110, and defines a predetermined space S below the heat pump module 110. The space S may be formed between the support 170 and the base 400 below the heat pump module 110. That is, as being supported by the supporter 170, the heat pump module 110 is disposed in an upper side being spaced apart from the base 400. The heat pump module 110 is space apart from the base 400, thereby the space S is provided in the base 400. Devices, for example, the steam generating module 130 and the controller 120, are mounted in the space S.

A plurality of supporters 170 may be provided. In some implementations, a pair of supporters 170 are spaced apart from each other in a front-and-rear direction on the base 400. The pair of supporters 170 may include supporter 170(1), 170(2). The supporter 170(1) may locate further forward than the supporter 170(2).

Figure 5B:
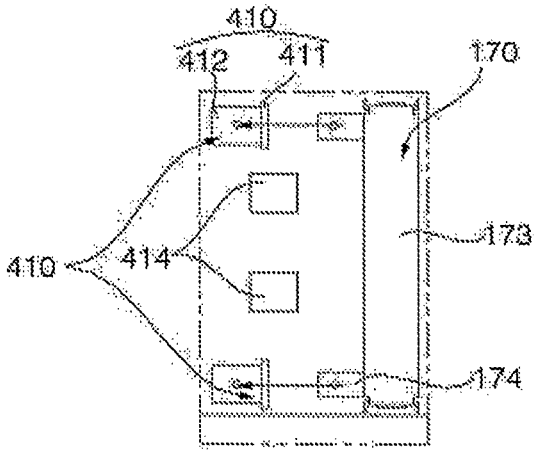

Referring to FIG. 5, the supporter 170 may include at least two legs 171 and 172 which are fixed on the base 400, and a shelf 173 which is extended in a lateral direction and supported by the legs 171 and 172. A supporter fixing tab 174 having a surface facing the base 400 may be formed at a lower part of the legs 171 and 172. As shown in (a) of FIG. 5, a supporter fixing part 410 may be formed in the base 400. The supporter fixing part 410 has a fastening hole 411 into which the supporter fixing tab 174 is inserted in a front-and-rear direction of the fabric treating apparatus 1.

The supporter fixing part 410 may be formed by cutting a portion having a predetermined length from the base 400 in a direction crossing a direction in which the supporter fixing tab 174 is inserted and then upwardly pressing a predetermined peripheral area 412 of the cut portion (e.g., the supporter fastening hole 411).

With the supporter fixing tab 174 being inserted into the supporter fixing part 410 through the supporter fastening hole 411, an upward movement of the supporter 170 is restrained as the supporter fixing tab 174 is retained by a bottom surface of the peripheral area 412 of the supporter fastening hole 411.

At least two supporters 170 may be provided. In some implementations, as shown in FIG. 5, as the supporter 170(1) disposed in front part of the base 400 moves forward, the supporter fixing tab 174 may be inserted into the supporter fastening hole 411. As the supporter 170(2) disposed in rear part of the base 400 moves backward, the supporter fixing tab [400] *174* may be inserted into the supporter fixing part 410 which is open toward the front direction. The base 400 and the supporter 170 may be coupled to each other by a fastening member, such as a screw or a bolt which penetrates the supporter fixing part 410 and the supporter fixing tab 174 in an up-and-down direction. The supporter 170 may be formed of a plastically deformable metal material. And the supporter fixing part may be formed by plastic working of the base.

By cutting and bending a metal plate according to a predetermined lay out, the supporter 170 may be formed to have the legs 171 and 172, the supporter fixing tab 174, and the shelf 173, which are integrated in the supporter 170 as one body. In some implementations, the supporter 170 may be formed of a molded product of synthetic resin, or may be formed with two or more components coupled to one another.

The heat pump module 110 may be disposed on the shelf 173. The shelf 173 may include a pair of side surfaces 173b which faces front side and rear side, respectively, and a top surface 173a connecting the pair of side faces 173b. The shelf 173 may be formed by bending a metal plate at least twice.

Figure 6B:
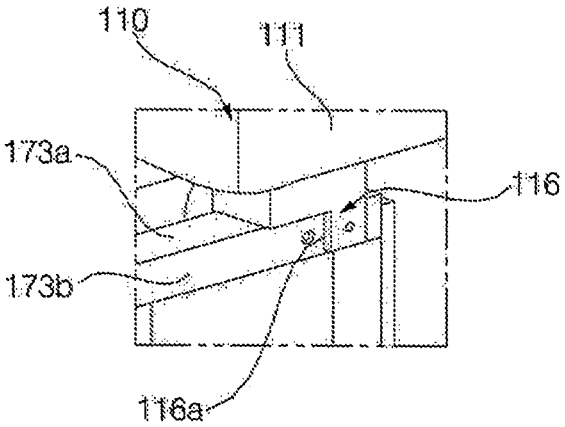

Referring to FIG. 6, at least one connecting part 115 and 116 to be coupled to the shelf 173 may be formed in a lower part of the housing 111. Referring to (a) of FIG. 6, the connecting part 115 may include a first contact surface 115a which contacts the top surface 173a of the shelf 173. The first contact surface 115a is substantially parallel with the top surface 173a. After the first contact surface 115a is put on the top surface 173a of the shelf 173, the first contact surface 115a and the top surface 173a of the shelf 173 may be coupled to each other by a fastening member.

Referring to (b) of FIG. 6, the connecting part 116 may have a second contact surface 116a which contacts the side surface 173b of the shelf 173. In some implementations, the second contact surface 116a is vertically disposed corresponding to the side surface 173b, and may be coupled to the side surface 173b of the shelf 173 by a fastening member. In some implementations, the first contact surface 115a is secured to the top surface 173a of the supporter 170(1), and the second contact surface 116a is secured to the side surface 173b of the supporter 170(2).

The controller 120 controls various devices composing the fabric treating apparatus 1, and may include a circuit substrate and electric components mounted on the circuit substrate. The heat pump module 110, the steam generating module 130, the blower 140 and/or the compressor 160 may be controlled by the controller 120.

The circuit substrate is accommodated in a body which defines an exterior of the controller 120. The controller 120 may be disposed in the space S between the supporter 170 and the base 400. In some implementations, the controller 120 is disposed on the base 400.

Referring to FIGS. 3, 4, and 5, a controller fixing tab 121 may be formed in a body of the controller 120, and a controller fixing hole 414 into which the controller fixing tab 121 is inserted may be formed on the base 400. The controller fixing tab 121 may be a plate which is extended forward or backward. With the controller fixing tab 121 being inserted into the controller fixing hole 414, upward movement of the controller 120 may be restrained because the controller fixing tab 121 is retained by a bottom surface of the base 400.

In some implementations, the controller fixing tab 121 projects in a forward direction from the body of the controller 120, and may be inserted into or separated from the controller fixing hole 414 according to forward or backward movement of the controller 120 on the base 400.

An opening (see FIG. 7) may be formed on a rear side of the casing 10 allowing at least the controller 120 to pass through. In some implementations, the opening is formed to allow even the heat pump module 110 and the steam generating module 130 to pass through.

In some implementations, the casing 10 may include a panel closing the opening, and the panel may be detachably coupled to the casing 10.

When the controller 120 is installed in the base 400 or detached from the base 400 for maintenance, the controller 120 may be transferred into or from the machinery room 120 through the opening. In some implementations, where the heat pump module 110 is disposed above the controller 120 and the blower 140 is disposed in front of the controller 120, the blower 140 or the controller 120 may not cause a problem when an attempt is made to detach the controller 120, so that the controller 120 may be drawn out from the machinery room 12 without detaching the blower 140 from the device assembly 2, and thus, facilitating repairing or replacing the controller 120.

The steam generating module 130 may be disposed inside the space S, and, in some implementations, above the controller 120. The steam generating module 130 may be fixed by the supporter 170. One of the steam generating module 130 and the supporter 170 may have a steam generating module fixing tab formed thereon, the other one may have an installation hole 175 (see FIG. 5) into which the steam generating module fixing tab is inserted. The steam generating module installation hole 175 may be formed on at least one of a pair of the supporters 170. In some implementations, the installation hole 175 is formed on the supporter 170(1).

The steam generating module installation hole 175 may be formed on the side surface 173b of the shelf 173. With the steam generating module fixing tab being inserted into the steam generating module installation hole 175, the steam generating module 130 is temporarily installed in the supporter 170. Then, being temporarily installed in the supporter 170(1), the steam generating module 130 may be secured to the supporter 170(2) by a fastening member.

Hereinafter, referring to FIG. 4, there is a procedure of how to assemble the device assembly 2. In FIG. 4, a dotted line indicates a location and a direction in which a fastening member is secured. As shown in (a) of FIG. 4, when the compressor 160 is mounted on the base 400, the heat pump module 110 may be mounted on the supporter 170. The connection part 115 and 116 of the heat pump module 110 is fixed onto the shelf 173 by a fastening member. A refrigerant pipe which guides refrigerant may be connected between the compressor 160 and the heat pump module 110.

Referring to (b) of FIG. 4, the controller 120 may be inserted into the space S below the supporter 170 and mounted on the base 400. After the controller 120 is placed at a right position by inserting the controller fixing tab 121 into the controller fixing hole 414, the controller 120 and the base 400 may be secured by a fastening member.

Referring to (c) of FIG. 4, the blower 140 may be mounted in front of the supporter 170. The blower 140 may be secured to a blower installation tab 420 by a fastening member.

Referring to (d) of FIG. 4, a water drain pump 182 and a water supply pump 186 may be mounted on the base 400. One of the water drain pump 182 and the water supply pump 186 may be disposed on one side of the blower 140, and the other one may be disposed on the opposite side thereof.

Referring to (e) of FIG. 4, the air intake duct 150 may be mounted in front of the blower 140. A pin extended in a front-and-rear direction may be formed on any one of the blower 140 and the air intake duct 150, and a pin hole into which the pin is inserted may be formed on the other one. After the air intake duct 150 is placed in a right position due to insertion of the pin into the pin hole, the air intake duct 150 and the blower 140 may be coupled to each other by a fastening member.

Referring to (f) of FIG. 4, after the steam generating module 130 is inserted into the space S below the supporter 170, the steam generating module fixing tab formed on the steam generating module 130 is inserted into the installation hole 175, so that the steam generating module 130 may be placed at a right position and then the steam generating module 130 and the supporter 170 may be coupled to each other by a fastening member. The fastening member may be coupled to the supporter 170(2) so as to facilitate detaching the steam generating module 130 through an opening formed on the rear surface of the casing 10 for maintenance and repair.

Referring to (g) of FIG. 4, a noise filter 183 and a handle 184, which user holds to move the device assembly 2, may be mounted on the base 400. The noise filter 183 lets only necessary components in a signal input to the controller 120 to pass, and reduces noise components.

Referring to (h) of FIG. 4, the water supply hose 185 connecting the water supply pump 186 and the steam generating module 130, a nozzle module, a hose connecting the nozzle module 181 and a sump, a hose connecting the nozzle module 181 and the water drain pump 182, and any other various hoses may be connected to devices.

Figure 7:
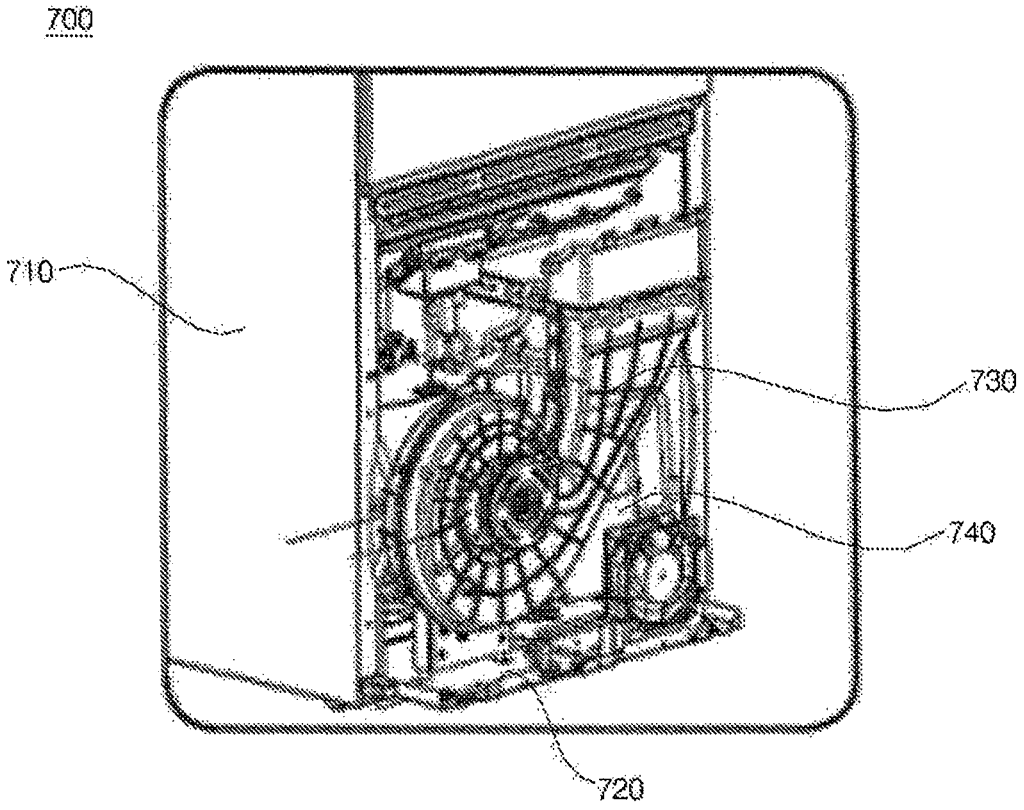
FIG. 7 is a diagram illustrating an example machinery room of an example fabric treating apparatus.

FIG. 7 is a diagram illustrating a machinery room of a conventional fabric treating apparatus. Referring to FIG. 7, a conventional fabric treating apparatus 700 has a machinery room below a casing 710, wherein various devices are installed in the machinery room. The devices to be installed in the machinery room includes not only a blower 730 and a compressor 740 which are shown in FIG. 7, but also a [stream] *steam* generating module, a heat pump module, and a controller which are shown in FIG. 3. Among them, the stream generating module, the heat pump module and/or the controller are not able to be drawn out from the machinery room for maintenance or repair without removing other devices, because the [stream] *steam* generating module, the heat pump module and/or the controller interfere with as the blower 730, the compressor 740, and the like, as shown in FIG. 7.

What is claimed is:

[1. A fabric treating apparatus comprising:

a casing that comprises:

a treating chamber that is configured to receive clothes; and a machinery room that is located below the treating chamber;

a base that is located at a bottom of the machinery room;

a heat pump module that is configured to condition air supplied to the treating chamber;

at least one supporter (a) that includes a shelf (i) that is supported by legs that are fixed to the base and (ii) that supports the heat pump module and that defines a space (i) between the base and the heat pump module and (ii) below the shelf and (b) that includes a first supporter fixing tab that includes a surface that faces the base and that is located at a lower part of at least one of the legs;

a steam generating module that is located in the space and that is configured to generate steam and supply steam to the treating chamber; and a controller that is configured to control at least one of the heat pump module or the steam generating module, the controller being located in the space and below the steam generating module, wherein the base includes a first supporter fixing part that includes a first supporter fastening hole that is configured to receive the first supporter fixing tab.]

[2. The fabric treating apparatus of claim 1, wherein the first supporter fixing tab is configured to slide into a pocket that is defined by the first supporter fastening hole.]

[3. The fabric treating apparatus of claim 2, wherein a size of the pocket is about equal to a size of the first supporter fixing tab.]

[4. The fabric treating apparatus of claim 1, wherein:

the at least one supporter comprises:

a first supporter that includes a second supporter fixing tab; and a second supporter that includes the first supporter fixing tab, the base comprises:

a second supporter fixing part that defines a second supporter fastening hole that is configured to receive the second supporter fixing tab, the second supporter fixing tab is configured to slide into the second supporter fastening hole in a first direction, and the first supporter fixing tab is configured to slide into the first supporter fastening hole in a second direction that is opposite the first direction.]

[5. The fabric treating apparatus of claim 1, wherein:

the base comprises a metal material, and the first supporter fixing part comprises a plastic material.]

[6. The fabric treating apparatus of claim 5, wherein the first supporter fixing part is formed by cutting, about perpendicular to a direction in which the first supporter fixing tab is configured to insert, a portion of the base having a predetermined length and then upwardly pressing a predetermined peripheral area of the cut portion.]

[7. The fabric treating apparatus of claim 6, wherein the first supporter fastening hole is formed through plastic deformation of the cut portion.]

[8. The fabric treating apparatus of claim 5, comprising a fastening member that is configured to couple the base and the at least one supporter and that vertically penetrates the first supporter fixing part and the first supporter fixing tab.]

[9. The fabric treating apparatus of claim 1, wherein:

the casing includes an opening that is located at a rear side of the casing and that is configured to receive the controller, the heat pump module is located above the controller, and the fabric treating apparatus further comprises a blower that is configured to blow air into an interior of the heat pump module.]

[10. The fabric treating apparatus of claim 9, further comprising:

a panel that is detachably coupled to the casing and that is configured to close the opening.]

[11. The fabric treating apparatus of claim 10, wherein the blower is located in front of the at least one supporter.]

[12. The fabric treating apparatus of claim 10, wherein the blower is coupled to the base.]

[13. The fabric treating apparatus of claim of claim 10, wherein the base comprises a blower installation tab that protrudes from the base and that is configured to couple to the blower.]

[14. The fabric treating apparatus of claim 12, further comprising:

an air intake duct that is configured to guide air into the blower and that is located in front of the blower.]

[15. The fabric treating apparatus of claim 14, wherein the air intake duct is fixed to at least one of the blower or the base.]

[16. The fabric treating apparatus of claim 1, wherein the controller includes at least one controller fixing tab that is configured to slide into a controller fixing hole that is located at the base.]

17. A fabric treating apparatus comprising:

a casing that comprises:

*an open front;* a treating chamber that is configured to receive clothes; [and]

a machinery room that is located below the treating chamber; *and*

*an opening located at a rear side of the casing;*

*a door rotatably coupled to the casing and configured to open or close the open front of the casing;*

*a device assembly that includes:* a base that is located at a bottom of the machinery room;

a heat pump module that is configured to condition air supplied to the treating chamber;

at least one supporter that includes a shelf (i) that is supported by legs that are fixed to the base and (ii) that supports the heat pump module and that defines a space (i) between the base and the heat pump module and (ii) below the shelf;

a steam generating module that is located in the space and that is configured to generate steam and supply steam to the treating chamber; and

*a blower that is configured to blow air into the heat pump module to circulate air into the treating chamber; and* a controller that is configured to control at least one of *the blower,* the heat pump module, or the steam generating module, [the controller being located in the space and below the steam generating module,]

wherein a steam generating module fixing tab is located at one of the steam generating module or the at least one supporter, [and]

wherein the fabric treating apparatus [defines] *further comprises* an installation hole that is configured to receive the steam generating module fixing tab [and that is],

*wherein the installation hole is* located (*i*) at [another of] the steam generating module *when the steam generating module fixing tab is located at the at least one supporter,* or (*ii*) *at* the at least one supporter [opposite the steam generating module fixing tab] *when the steam generating module fixing tab is located at the steam generating module, and*

*wherein the device assembly is configured to be extracted through the opening.*

18. The fabric treating apparatus of claim 17, wherein:

the at least one supporter comprises a pair of supporters that are spaced apart from each other and that are about perpendicular to a front and rear direction of the base, the installation hole is located on one of the pair of the supporters, [and]

the steam generating module is coupled, by a fastening member, to another one of the pair of the supporters opposite the installation hole, and the steam generating module fixing tab is inserted into the installation hole.

*19. The fabric treating apparatus of claim 17, further comprising:*

*a panel that is detachably coupled to the casing and configured to cover at least a portion of the rear side of the casing when attached to cover the opening of the casing,*

*wherein the controller is exposed to an outside or accessible when the panel is detached from the casing.*

*20. The fabric treating apparatus of claim 17, wherein the controller is coupled to the device assembly and is configured to be removable from the fabric treating apparatus with the device assembly.*

*21. The fabric treating apparatus of claim 17, wherein the device assembly further includes a sump to collect condensed water from a steam supply path transporting steam generated by the steam generating module toward the treating chamber.*

*22. The fabric treating apparatus of claim 21, wherein the sump is further connected to the treating chamber and collects condensed water from the treating chamber.*

*23. The fabric treating apparatus of claim 21, further comprising:*

*an air intake duct located in front of the blower with respect to the open front and configured to guide air from the treating chamber toward the blower.*

*24. The fabric treating apparatus of claim 23, wherein the sump is located in a lower inner region of the air intake duct.*

*25. The fabric treating apparatus of claim 23, wherein the air intake duct includes an air flow path through which air passes, and a width of the air flow path in a front-and-rear direction is less than a width of the air flow path in a left-and-right direction.*

*26. The fabric treating apparatus of claim 25, wherein the intake duct further includes an opening configured to receive air from the treating chamber, and the air flow path is inclined backward and downward near the opening of the intake duct.*

*27. The fabric treating apparatus of claim 23, wherein one of the blower or the air intake duct includes a pin extended in a front-and-rear direction,*

*wherein the blower includes a pin hole to receive the pin in the air intake duct or the air intake duct includes the pin hole to receive the pin in the blower, such that the air intake duct and the blower are aligned when the pin is inserted into the pin hole, and*

*wherein the air intake duct and blower are coupled together by a fastener.*

*28. The fabric treating apparatus of claim 17, wherein the base includes a handle located at rear region of the base and configured to be held by a user when removing the device assembly from the casing.*

*29. The fabric treating apparatus of claim 17, wherein the legs include a mount configured to be fixed to the base.*

*30. The fabric treating apparatus of claim 29, wherein the base includes a hole configured to fix the mount.*

*31. The fabric treating apparatus of claim 17, wherein the blower is located in front of the at least one supporter with respect to the open front.*

*32. The fabric treating apparatus of claim 17, further comprising:*

*an air intake duct located in front of the blower with respect to the open front and configured to guide air from the treating chamber toward the blower,*

*wherein the blower includes*

*a fan rotated by a motor;*

*an opening of the blower that is connected to the air intake duct and configured to introduce air from the air intake duct to the fan; and*

*a vent configured to discharge air blown by the fan toward the heat pump module.*

*33. The fabric treating apparatus of claim 32, wherein the heat pump module includes:*

*a housing configured to define an inner space to house a condenser and an evaporator;*

*an air inlet configured to introduce air into the inner space; and*

*an air outlet configured to discharge air heat-exchanged with the evaporator to the treating chamber, and*

*wherein air discharged from the vent of the blower flows into the housing of the heat pump module through the air inlet.*

*34. A fabric treating apparatus comprising:*

*a casing that includes:*

*an open front;*

*a treating chamber that is configured to receive clothes through the open front;*

*a machinery room that is separated from the treating chamber; and*

*an opening located at a rear side of the casing;*

*a door rotatably coupled to the casing and configured to open or close the open front of the casing; and*

*a device assembly that includes:*

*a base that is located at a bottom of the machinery room;*

*a heat pump module that is configured to condition air supplied to the treating chamber;*

*at least one supporter that includes a shelf (i) that is supported by legs that are fixed to the base and (ii) that supports the heat pump module and that defines a space (i) between the base and the heat pump module and (ii) below the shelf;*

*a steam generating module that is located in the space and that is configured to generate steam and supply steam to the treating chamber; and*

*a blower that is configured to blow air into the heat pump module to circulate air into the treating chamber,*

*wherein a steam generating module fixing tab is located at one of the steam generating module or the at least one supporter,*

*wherein the fabric treating apparatus further comprises an installation hole that is configured to receive the steam generating module fixing tab,*

*wherein the installation hole is located (i) at the steam generating module when the steam generating module fixing tab is located at the at least one supporter, or (ii) at the at least one supporter when the steam generating module fixing tab is located at the steam generating module, and*

*wherein the device assembly is configured to be extracted through the opening.*

*35. The fabric treating apparatus of claim 34, wherein the blower is located in front of the at least one supporter.*

*36. The fabric treating apparatus of claim 34, further comprising:*

*a panel that is detachably coupled to the casing and configured to cover at least a portion of the rear side of the casing when attached to cover the opening of the casing.*

* * * * *